United States Patent
Rajagopalan et al.

(10) Patent No.: US 8,930,121 B2
(45) Date of Patent: Jan. 6, 2015

(54) OFFSET AND SLOW RESPONSE DIAGNOSTIC METHODS FOR NOX SENSORS IN VEHICLE EXHAUST TREATMENT APPLICATIONS

(75) Inventors: Sai S. V. Rajagopalan, Sterling Heights, MI (US); Yue-Yun Wang, Troy, MI (US); Scott T Feldmann, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 13/081,801

(22) Filed: Apr. 7, 2011

(65) Prior Publication Data

US 2012/0255277 A1  Oct. 11, 2012

(51) Int. Cl.
| | |
|---|---|
| F02D 45/00 | (2006.01) |
| F01N 3/08 | (2006.01) |
| F02D 41/22 | (2006.01) |
| F02D 41/12 | (2006.01) |
| F02D 41/14 | (2006.01) |
| F01N 11/00 | (2006.01) |
| F01N 3/20 | (2006.01) |

(52) U.S. Cl.
CPC ............ *F02D 41/222* (2013.01); *F02D 41/123* (2013.01); *F02D 41/1463* (2013.01); *F01N 3/0814* (2013.01); *F01N 3/2066* (2013.01); *F01N 2560/026* (2013.01); *F01N 2560/06* (2013.01); *F02D 2041/228* (2013.01); *F02D 2200/0614* (2013.01)
USPC ..................... 701/114; 73/114.61; 73/114.71; 60/277

(58) Field of Classification Search
USPC ............... 701/114, 108, 109, 115; 73/114.61, 73/114.67, 114.71, 114.75; 60/274, 276, 60/277, 278, 285, 297
See application file for complete search history.

(56) References Cited

U.S. PATENT DOCUMENTS

| 8,215,098 B2 * | 7/2012 | Wang et al. ...................... 60/277 |
| 2009/0165543 A1 * | 7/2009 | Wakahara .................. 73/114.61 |
| 2013/0060486 A1 * | 3/2013 | Takahashi et al. .............. 702/24 |

FOREIGN PATENT DOCUMENTS

| CN | 101809261 A | 8/2010 | |
| DE | 19911664 A1 | 9/2000 | |
| DE | 10244125 A1 | 4/2004 | |
| DE | 102004048136 A1 | 4/2006 | |
| DE | 102007048751 A1 | 5/2008 | |
| EP | 002573371 A1 * | 3/2013 | ............. F02D 45/00 |
| JP | 2005240618 A | 9/2005 | |
| WO | 2010151690 A2 | 12/2010 | |

* cited by examiner

*Primary Examiner* — Hieu T Vo
(74) *Attorney, Agent, or Firm* — Reising Ethington P.C.

(57) ABSTRACT

A method that includes in-vehicle systems and practices for determining whether a NOx sensor in an exhaust stream is performing properly.

12 Claims, 8 Drawing Sheets

Magnified Response from a Good NOx Sensor

Magnified Response from a Bad (Slow) NOx Sensor

OFFSET AND SLOW RESPONSE DIAGNOSTIC METHODS FOR NOX SENSORS IN VEHICLE EXHAUST TREATMENT APPLICATIONS

TECHNICAL FIELD

This disclosure pertains to on-vehicle testing methods to assess electrical output signals from sensors placed in diesel engine (or other lean-burn engine) exhaust gas streams to detect amounts of nitrogen oxides (NOx) in the exhausts. Such NOx concentration-related, voltage or current signals are used by on-vehicle computer-based control systems for management of engine operation, and for management and assessment of engine exhaust treatment. More specifically, this disclosure pertains to on-vehicle testing of such NOx sensors to assess their zero-point readings and their response times to changes in exhaust compositions.

BACKGROUND OF THE INVENTION

Multi-cylinder, reciprocating piston vehicle engines for driving automotive vehicles produce hot flowing exhaust gas streams which are treated after they leave the exhaust manifold of the engine to oxidize unburned hydrocarbons and carbon monoxide to carbon dioxide and water, and to reduce mixtures of nitrogen oxides (NOx) to nitrogen and water before the gas is released from the tailpipe into the atmosphere.

Many spark-ignited, gasoline engines are operated with fuel and air additions to the engine cylinders varying closely about the stoichiometric air-to-fuel mass ratio of about 14.7/1. Exhaust after-treatment is then accomplished using an oxygen sensor and a three-way catalyst system which is managed to promote both oxidation and reduction reactions for yielding a cleaned exhaust. Diesel fueled, compression-ignition engines, and other lean-burn engines are generally operated at air-to-fuel mass ratios that are well above the stoichiometric ratio and, thus, charge an abundance of air into the combustion cylinders. The exhaust from such engine operations contains more oxygen and nitrogen oxides than traditional gasoline engine exhaust. Exhaust treatment from lean-burn engines often uses an upstream oxidation catalyst for unburned hydrocarbons and carbon monoxide, and for oxidation of some NO to $NO_2$. After passage through the oxidation catalyst, a reductant material for nitrogen oxides, such as urea, is injected into and mixed with the hot exhaust gas. The gas is then passed into contact with a catalyst material selected for a reaction between reductant material and nitrogen oxides to form nitrogen and water for release from the exhaust passage. The reaction is called a "reduction" reaction because the oxygen content of the nitrogen compounds is reduced. This exhaust gas reduction practice is often called selective catalytic reduction (SCR) of NOx.

SCR-type exhaust after-treatment systems require NOx sensors that are inserted in the exhaust stream for use in managing the addition of the reductant material to the exhaust stream and other after-treatment practices. NOx sensors are often formed as small electrochemical cells that function, for example, by producing voltage or electrical current signals responsive to the amount of nitrogen oxide species flowing in the exhaust and over sensor surfaces. NOx sensor data may be also used in assessing whether catalysts for NOx reduction, or other exhaust after-treatment materials, are working properly.

There is a need for on-vehicle systems and practices for determining whether a NOx sensor in an exhaust stream is performing properly. When a NOx sensor used in a vehicle exhaust system is not functioning properly, it is often necessary for the fault to be promptly diagnosed and reported to a vehicle operator. This disclosure pertains to on-vehicle, computer-conducted and managed diagnostic methods to assess certain aspects of the performance capabilities of these important NOx sensors.

SUMMARY OF THE INVENTION

The exhaust stream from a diesel engine typically contains, by volume, up to about ten percent of oxygen, about 100 to 2000 parts-per million (ppm) of nitrogen oxide (NO), and about 20-200 ppm of nitrogen dioxide ($NO_2$). A NOx sensor is employed at a predetermined location in the exhaust stream to quickly determine current quantities of NOx constituents for determining, for example, how much reductant material should be currently added to affect conversion of the NOx to nitrogen and water. In this example, the sensor would be located upstream of a reductant material injection device and of an SCR catalyst material. In another example, a NOx sensor is located downstream of an SCR catalyst material, in the flow of the exhaust stream, to confirm the reduction of the NOx.

Many sensors for nitrogen oxides in engine exhaust streams are made of ceramic-type metal oxides such as zirconium oxide (zirconia, $ZrO_2$) stabilized with yttrium oxide (yttria, $Y_2O_3$). These materials have been used in oxygen sensors and are adapted as NOx sensors. They are compacted as dense ceramics that conduct oxygen ions at the high temperatures of a tailpipe, such as 300° C., and higher. A surface of the oxide body of the sensor is provided with a pair of high temperature electrodes which may be formed, for example, of platinum, gold, or palladium, or of other metal oxides. The sensor is formed to provide an electrical signal such as a change in voltage or current as a function of concentration of nitrogen oxides at the sensor location in the exhaust stream. Electrical leads from a sensor are used to transmit the signal to a suitable computer control system for managing the operation of the exhaust treatment system. A computer based system for controlling exhaust treatment may be part of or in communication with, an engine operating control system because of the close relationship between management of engine fueling and operation and exhaust gas composition.

In accordance with embodiments of this invention, algorithms are provided for on-vehicle, computer-managed diagnosis of operating characteristics of one or more NOx sensors use in remediation of the vehicle's exhaust gas stream.

BRIEF DESCRIPTION OF THE DRAWINGS

One or more preferred exemplary embodiments of the invention will hereinafter be described in conjunction with the appended drawings, wherein like designations denote like elements, and wherein.

DESCRIPTION OF PREFERRED EMBODIMENTS

The methods described herein can diagnose NOx sensor responsiveness and/or accuracy using the output generated from such sensors. More specifically, the methods can determine if a NOx sensor responds too slowly or generates output that is too far away (e.g. offset) from a zero-point. And these determinations can be made by analyzing the output received from the NOx sensor. NOx sensor offsets that are below the zero point can cause emissions breakthrough because of incorrect urea dosage and also cause inability to diagnose SCR catalyst faults. On the other hand, NOx sensors having an offset above the zero point can cause excessive treatment of exhaust gas and can lead to ammonia slip. In some instances, NOx sensors fail to respond quickly enough to variations in the amount of NOx constituents in the exhaust gas. The NOx sensor response time to these variations can affect the amount of treatment added to the exhaust gas. If the NOx sensor fails to respond quickly enough to changes in exhaust gas NOx content, the treatment levels added to the exhaust gas may be larger or smaller than that which is desired thereby leading to the excessive emissions breakthrough or ammonia slip discussed above. Thus, detecting the low/high offset NOx sensor condition or poorly-responding NOx sensors and alerting a driver of these conditions can lead to its quick correction.

Figure 1:
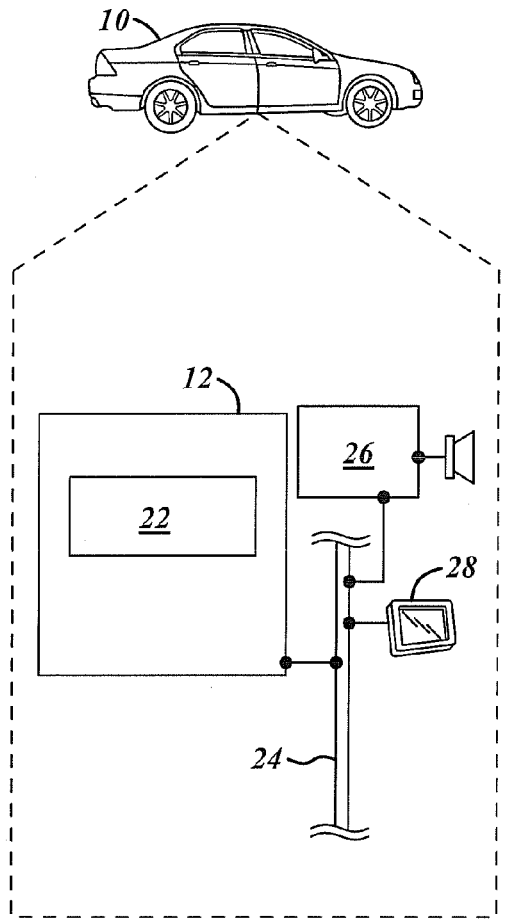
FIG. 1 is a block diagram depicting an exemplary embodiment of a vehicle used with the methods described herein.

Turning to FIG. 1, a vehicle 10 is shown that includes an engine control unit (ECU) 12 that not only receives data output from NOx sensors but also performs various computing tasks onboard the vehicle 10. Vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 10 includes a vehicle engine (not shown) for propulsion, such as the Diesel-fueled, compression-ignition engines discussed above or other lean-burn engines.

Figure 2:
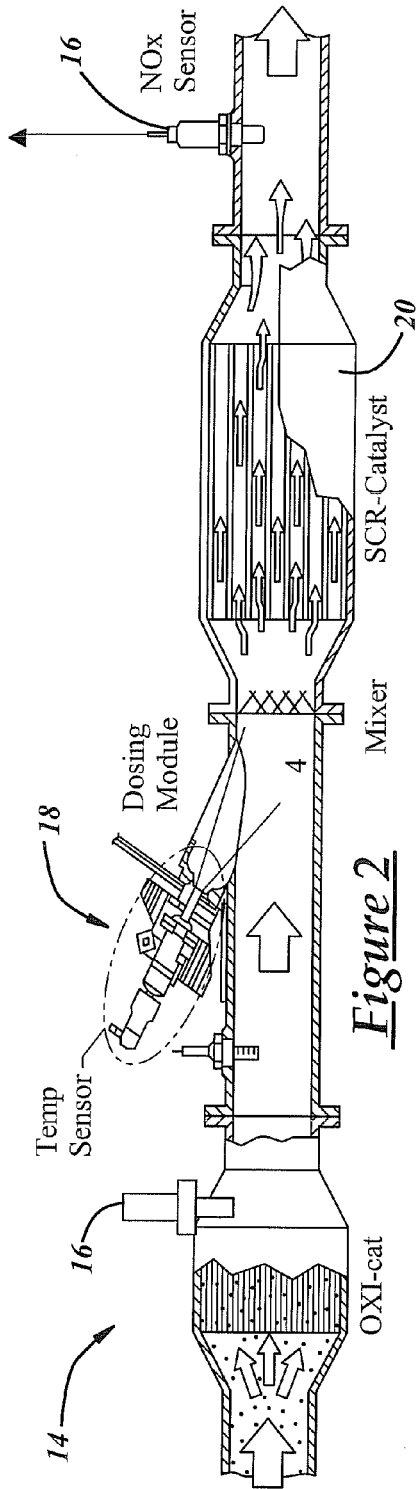
FIG. 2 is a diagram depicting an exemplary embodiment of a vehicle exhaust system used with the methods described herein.

Turning to FIG. 2, a vehicle exhaust system 14 used by the vehicle 10 is shown that can expel exhaust gases that include NOx. The vehicle exhaust system 14 can include various elements, such as one or more NOx sensors 16 for measuring the NOx content of the exhaust gas, a dosing module 18 for introducing ammonia or some other exhaust treatment into the exhaust gas, and an SCR catalyst 20 through which the treated exhaust gas will flow. The NOx sensors 16 can be located in such a way to monitor exhaust gas as it leaves the vehicle engine and/or positioned downstream of the SCR catalyst 20 to measure the NOx content of the treated exhaust.

The ECU 12 shown in FIG. 1 can be any type of device capable of processing electronic instructions including microprocessors, microcontrollers, host processors, controllers, vehicle communication processors, and application specific integrated circuits (ASICs). It can be a dedicated processor used only for controlling vehicle engine/emissions functions or can be shared with other vehicle systems. ECU 12 executes various types of digitally-stored instructions, such as software or firmware programs stored in memory 22, which enable the ECU 12 to provide a wide variety of services. And a vehicle bus 24 can communicate data and exchange commands between the NOx sensor 16 and the ECU 12—as well as other modules located on the vehicle 10. Some of these other modules include an audio system 26 having at least one speaker and a visual display 28 that are capable of audibly or visually communicating messages to a vehicle occupant. For instance, ECU 12 can execute programs or process data to carry out at least a part of the method discussed herein. In addition, the ECU 12 can include one or more timers and/or counters that can provide a timing and/or a counting function for the method discussed herein.

Figure 3:
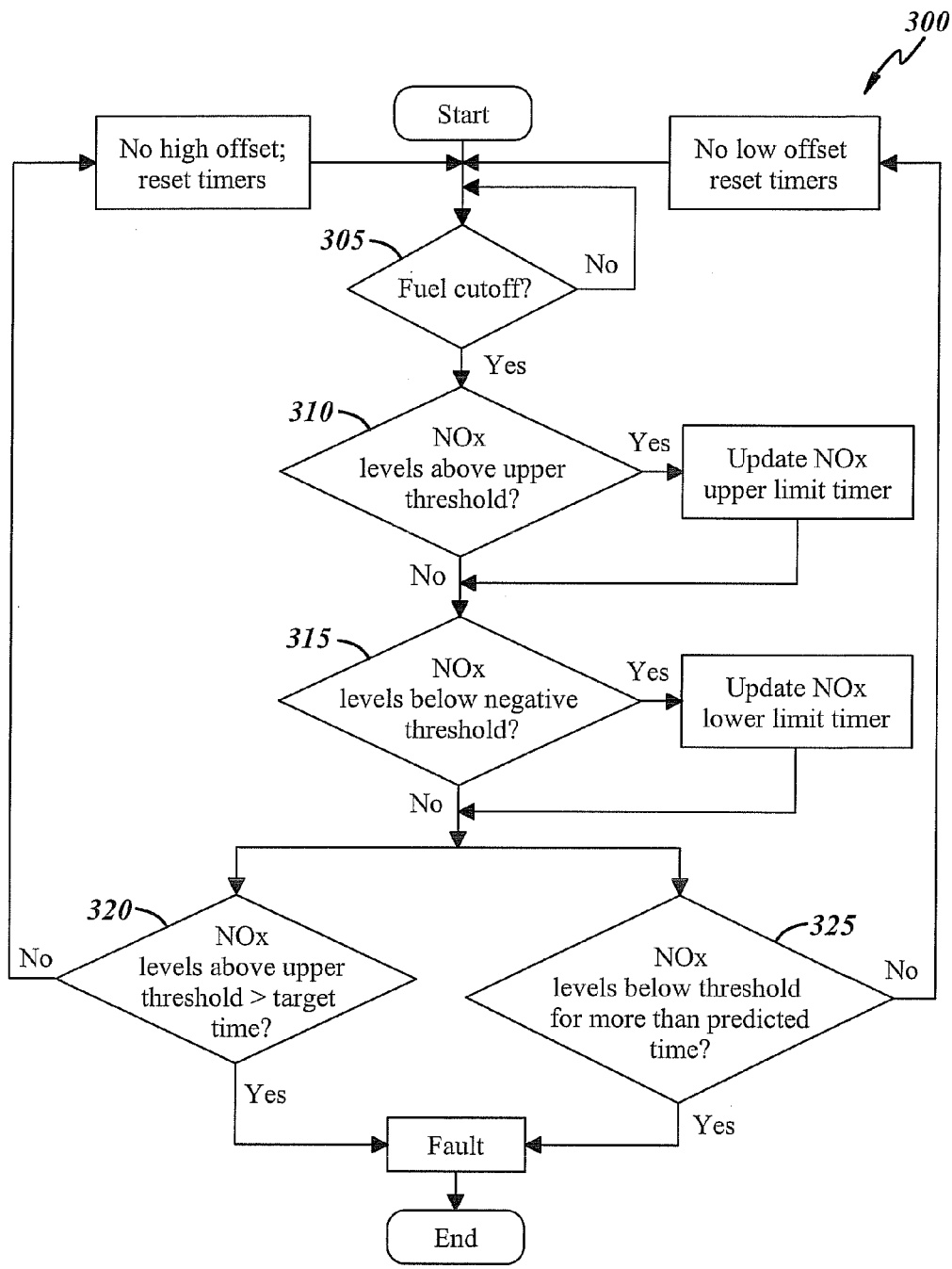
FIG. 3 is a flow chart of an exemplary embodiment of the methods described herein.

Turning to FIG. 3, there is shown an exemplary method 300 of diagnosing vehicle NOx sensor faults. This method 300 can determine whether a low or high offset condition exists with regard to a particular NOx sensor 16. The method 300 begins at step 305 with determining the fuel flow to the vehicle engine has stopped. The term "determining" can represent a variety of actions, such as using the ECU 16 to determine that fuel is no longer being provided to the vehicle engine (e.g. a deceleration fuel-cut off or clutch fuel cut-off event). Ultimately, there are a variety of ways in which the method 300 can determine when fuel has stopped flowing to the vehicle engine. Stopping fuel flow to the vehicle engine can end NOx production by ending the combustion process that creates vehicle exhaust gas thereby creating a baseline from which to determine whether or not a NOx sensor 16 is faulty. That is, if NOx is not produced, NOx sensors 16 should not generate output signaling that NOx is present in significant quantities. The stoppage of fuel flow can also start a timer that monitors the total time that elapses during the method 300. This timer can be called the master timer and can be implemented in a variety of ways, such as using the counter of a microprocessor like ECU 12. The method 300 proceeds to step 310.

At step 310, it is determined whether NOx levels in the exhaust gas are above an upper threshold. If so, a timer recording the amount of time that NOx levels remain above the upper threshold can be updated. This timer can be called an NOx upper limit timer and can be used to determine the amount of time NOx levels remain above an upper threshold. The timer can be implemented using a counter function on ECU 12 or another microprocessor capable of carrying out timing functions. Otherwise, if NOx levels are below the upper threshold, the timer is not updated and the method 300 proceeds to step 315.

At step 315, it is determined whether exhaust gas NOx levels are below a negative threshold. If so, then a timer measuring the amount of time the NOx levels are below the negative threshold is updated and the method 300 proceeds to step 320. Otherwise, the method 300 proceeds to step 320 without updating the timer. This timer can be called an NOx lower limit timer and can be used to determined the amount of time NOx levels remain below an lower threshold. Like the upper limit timer, the lower limit timer can be implemented using a counter function on ECU 12 or another microprocessor capable of carrying out timing functions.

At step 320, it is determined whether the exhaust gas NOx levels are above the upper threshold for longer than a predetermined target time. This can be carried out by comparing the value of the NOx upper limit timer with a predetermined upper limit time value that can be stored at the vehicle 10. The predetermined upper limit time value can be an amount of time beyond which would indicate that the NOx sensor 16 is experiencing a high offset condition. In one example, the ECU 12 can access the stored predetermined upper time limit value and compare it to the NOx upper limit timer. If the upper limit timer is less than the stored predetermined upper time limit, then it can be determined that a high offset condition does not exist and all of the timers can be reset. Otherwise, the master timer can be updated and the method 300 can proceed to step 325.

At step 325, a counter for determining how long exhaust gas NOx levels remain below the negative threshold is checked to determine if its value has exceeded a predetermined target value. This counter can be called the negative threshold counter. If the negative threshold counter is determined to be below the predetermined target value, then a low offset condition does not exist and the timers used during method 300 can be reset and the method 300 can return to step 305. However, if the counter value exceeds the predetermined target value, then a low offset condition may exist which triggers a flag alerting a vehicle occupant of this condition (e.g. fault). The timers can then be reset and the method 300 can end.

An optional step can include determining if the duration of the test exceeds a maximum amount of time allotted for the test. For example, if the test duration as measured by the master timer is greater than the maximum amount of time allotted, then it can be determined that a high offset condition exists. This condition can trigger a flag that alerts the operator or the ECU 12 and the timers can then be reset and the method 300 can end. A condition to accept the diagnostic test results can be a check to determine if the fuel cut-off has lasted for a time greater than a pre-determined minimum fuel cut-off time. This can prevent false alarms during offset detection.

Another aspect of the diagnostic method described herein involves detecting NOx sensors 16 whose response time relative to a change in fuel flow to the vehicle engine has slowed to an amount greater than an acceptable time constant. In general, changes in fuel flow should also change the output of NOx gasses thereby resulting in output changes from a NOx sensor 16. For example, the amount of time a normally-operating NOx sensor 16 uses to respond to a change in fuel flow can be 500 milliseconds to 1 second. That is, output from the NOx sensor 16 generally responds to a change in fuel flow within 0.5-1.0 seconds. In contrast, the time constant for a poorly-performing NOx sensor 16 may be approximately 20 seconds, which can mean that the NOx sensor 16 is taking much longer to respond to changes in fuel flow. Various methods can be used to detect slowly-responding NOx sensors 16.

Figure 4:
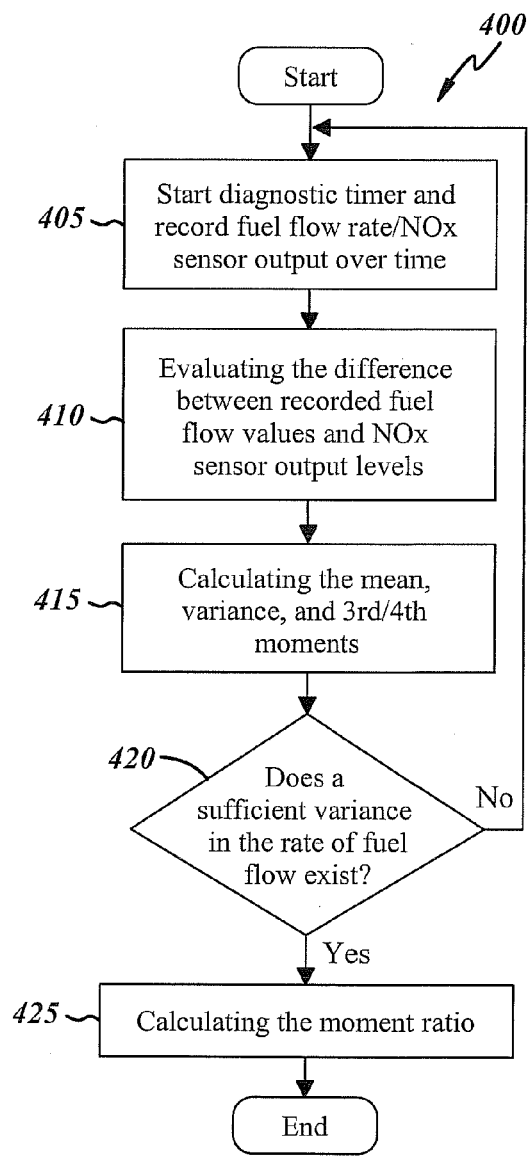
FIG. 4 is a flow chart of another exemplary embodiment of the methods described herein.

Turning to FIG. 4, there is shown an exemplary method 400 of diagnosing vehicle NOx sensor faults. More particularly, the method 400 involves recording the output from a NOx sensor 16 over a period of time and analyzing the statistical distribution of the incremental change of the sensor output over that period of time. From a visual perspective, the incremental change of the sensor output measured over time from a normally-operating NOx sensor 16 should include relatively long tail sections if the output were graphically represented. These tail sections can represent the sensor output furthest from the mean value of the incremental change in the sensor output value. On the other hand, NOx sensors 16 that respond slowly may have very short tail sections because the range of sensor output does not move far from the mean value of that range over the same amount of time.

The method 400 begins at step 405 by starting or updating a diagnostic timer and recording both the fuel flow rate to the vehicle engine and the NOx sensor 16 output over a period of time. The ECU 12 or other processing device can provide the timer, which can monitor the duration of the diagnostic process and provide timing functions for determining the period over which the NOx sensor output and/or the fuel flow rate was recorded. In addition, the ECU 12 or other processing device can be in communication with a fuel sensor that is capable of sending the ECU 12 an output signal that indicates the measured amount of fuel flowing to the vehicle engine at any given time. The output signal (or the data it contains) can be stored in memory 22. The output signal from the fuel sensor can be stored as a variable number of discrete measurements that are recorded for analysis. Using the measured amount of fuel flow, the ECU 12 can use its processing capabilities to analyze the data (e.g. the discrete measurements) to determine the rate at which fuel flows to the vehicle engine as well as detecting changes to the rate of fuel flow. Similarly, the NOx sensor output can be received by the ECU 12 and stored in the memory device. The NOx sensor output can be stored as discrete measurements of NOx levels over a period of time. The ECU 12 can analyze the discrete measurements of NOx levels to determine the rate of NOx sensor output change over time. The recording and analysis of both fuel flow and NOx sensor data can take place on-board the vehicle 10, which can use the ECU 12 or other computing resources to carry out these tasks. The method 400 proceeds to step 410.

At step 410, the successive differences between the recorded fuel flow values and the NOx sensor output levels are calculated. Given a set of discrete fuel flow values or measurements and/or a set of discrete NOx sensor output levels, the amount of change or difference between two or more values can be calculated resulting in the delta y ($\Delta y$) between those values. The $\Delta y$ can represent the rate of change between successive or non-successive values. And $\Delta y$ can be calculated using the following formula:

$$\Delta y = y(k) - y(k-1)$$

for a set of k values. The method 400 proceeds to step 415.

At step 415, the mean, variance, the third moment, and the fourth moment is calculated for the rate of fuel flow as well as the NOx sensor output. In one example, the mean and variance can be calculated for the set of discrete fuel flow values or calculated rates of fuel flow. The mean and variance for the set of discrete fuel values can be calculated using computing resources located onboard the vehicle 10—such as the ECU 12—using mathematical/statistical techniques known to those skilled in the art. This calculation can be carried out using the ECU 12 or another computer processing device. The set of discrete fuel flow values or calculated rates of fuel flow can be recursively analyzed by calculating the third and fourth moments. For example, the fourth moment of the differential for set of discrete fuel flow values over n data points or values can be calculated using the following formula:

$$m_4(\Delta y) = \frac{\sum_{i=1}^{n}(\Delta y_i - \Delta y_{mean})^4}{n}$$

It is possible and perfectly satisfactory to detect the length of the tail of the distribution of discrete values by calculating the second moment, however the fourth moment provides a more accurate prediction of tail length. While the mean, variance, and third/fourth moment calculations have been described with respect to the fuel flow values, the same calculations can be made for the discrete NOx sensor output values. That is, the mean of the set of NOx sensor output levels or values can be calculated as well as the variance of the NOx sensor output levels. In addition, the third and fourth moments of the set of NOx sensor output levels can be calculated. As a result, the outcome of the calculations can at least yield the fourth moment of the rate of fuel flow change and the fourth moment of the rate of NOx sensor output change. The fourth moment for the fuel flow change can be represented as $m_4(\Delta fuel)$ whereas the fourth moment of for the NOx sensor output change can be represented as $m_4(\Delta NOx)$. The method 400 proceeds to step 420

At step 420, it is determined whether a sufficient variance in the rate of fuel flow exists to obtain reliable results. The variance calculated in step 415 with respect to the rate of fuel flow can be compared with a threshold to determine if a sufficiently large variance in the fuel flow exists to perform the method 400. The change in NOx sensor output can be based on the change in fuel flow to the vehicle engine. In order to ensure that the NOx sensor 16 experiences a sufficient change in input (e.g. varying NOx levels in the exhaust gas), it is helpful if there is a sufficiently large change in fuel flow to help cause the corresponding change in NOx sensor output. Otherwise, insufficient changes in fuel flow may generate relatively stable levels of NOx in the vehicle exhaust gas. As a result, the NOx sensor 16 may be performing satisfactorily yet the relatively small variation in fuel flow/NOx levels may not cause the NOx sensor 16 output to significantly vary. This can improperly indicate that the NOx sensor 16 is faulty when it in fact may be operating normally. If the variance is not sufficient, the method 400 proceeds to step 405; otherwise the method 400 proceeds to step 425.

At step 425, fourth moment for the fuel flow change $m_4(\Delta fuel)$ is divided by the fourth moment of for the NOx sensor output change $m_4(\Delta NOx)$ to calculate a moment ratio. The moment ratio can be used as a testing condition to determine how much the NOx sensor 16 lags the change in the flow of fuel to the vehicle engine. If the moment ratio is sufficiently large, it can be determined that the NOx sensor 16 may not be responding to changes in the flow of fuel to the vehicle engine and correspondingly the sensor may not be responding to the change in NOx levels in the exhaust gases. In one example, a moment ratio threshold can be stored in the memory portion of the ECU 12 when the vehicle 10 is manufactured. In one example, the ECU 12 can compare the calculated moment ratio threshold to the moment ratio threshold and when the calculated moment ratio exceeds the stored threshold, the ECU 12 can signal a vehicle occupant or other person that the NOx sensor 16 is faulty. The method 400 then ends.

Figure 5A:
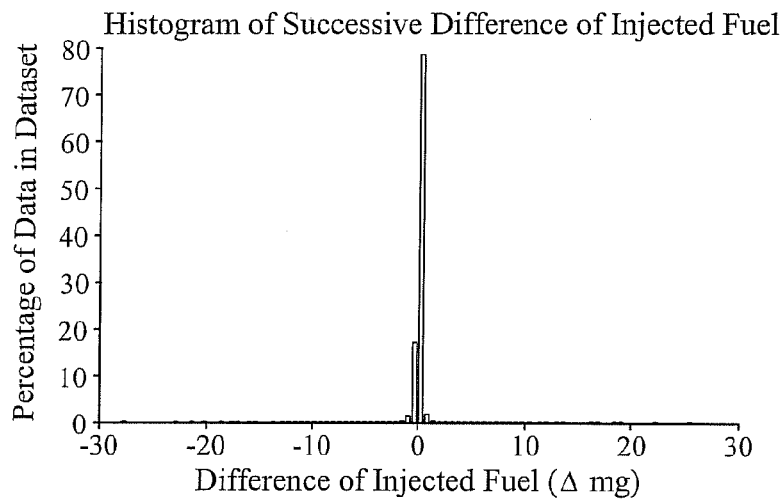
FIGS. 5(a)-(c) are graphs of various measurements and/or outcomes discussed with respect to the methods described herein.
Figure 5B:
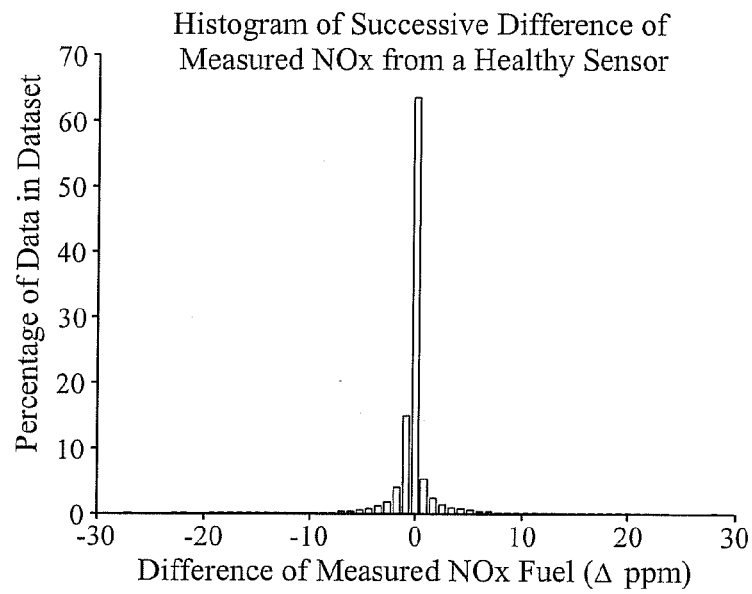
Figure 5C:
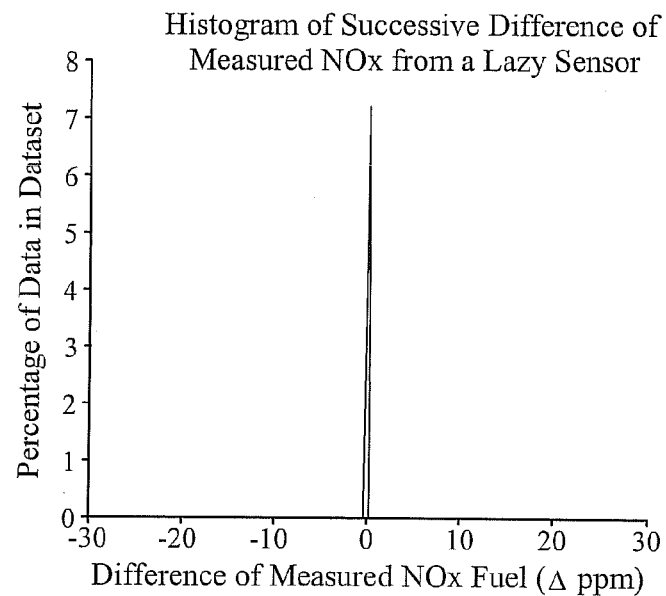

FIGS. 5(a)-5(c) depict graphical outcomes of various measurement discussed with respect to the method 400 above. FIG. 5(a) represents the changes in fuel supplied to the vehicle engine over a particular data set or time period. The change in fuel supplied is represented as a change in milligrams supplied ($\Delta mg$) and the graph in FIG. 5(a) shows a range from a decrease of approximately −28 mg to an increase of approximately 26 mg. So, the graph depicting changes in fuel supplied to the vehicle engine includes well-defined tail sections (e.g. the area of the graph from −28 mg to approximately −2 mg and from approximately 2 mg to 26 mg). FIG. 5(b) shows a graph of measured NOx output from a properly functioning or healthy sensor. It includes NOx measured by the NOx sensor 16 as change in parts-per million ($\Delta ppm$). The graph shown in FIG. 5(b) can be seen as corresponding to FIG. 5(a) such that the graph of $\Delta ppm$ in NOx has well-defined tails much like the graph shown in FIG. 5(a). In contrast, FIG. 5(c) shows a graph of a NOx sensor 16 that is not functioning properly. Like the graph in FIG. 5(b), this graph measures the output from a NOx sensor 16 as $\Delta ppm$; but unlike the graph in FIG. 5(b), this graph does not include tail sections. Or in other words, the NOx sensor output represented by the graph in FIG. 5(c) may not be responding to the change in fuel flow and thereby not detecting changes in NOx levels.

Figure 6:
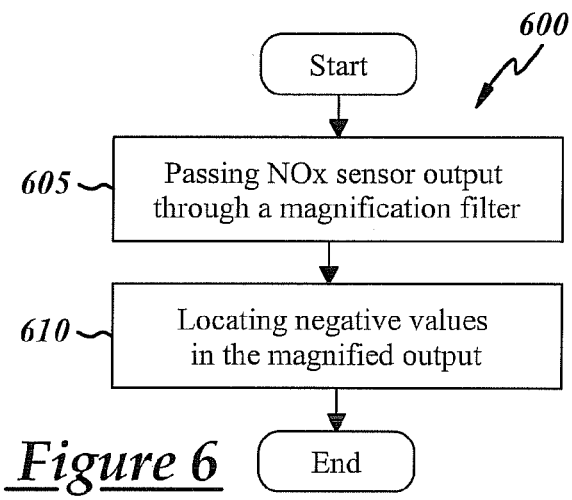
FIG. 6 is a flow chart of yet another exemplary embodiment of the methods described herein.

Turning to FIG. 6, there is shown an exemplary method 600 of diagnosing vehicle NOx sensor faults. More particularly, the method 600 involves magnifying the output from a NOx sensor 16 using a selective magnification filter and if the magnified output yields negative values, or values below a specified diagnostic threshold in a given range of time where the fueling is dynamic, then the NOx sensor 16 can be seen as operating normally. On the other hand, if the magnified output in that range does not include negative data points or data points below a specified diagnostic threshold, then it can be determined that the NOx sensor 16 is faulty and/or not performing optimally. The method 600 begins at step 605 by passing sensor data received from the NOx sensor 16 via an output signal through a magnification filter. In one example, the NOx sensor 16 can selectively send data through a magnification filter depending on whether or not a diagnostic check of NOx sensors 16 is taking place. Because the behavior of a NOx sensor can be approximated using a first order filter, the magnification filter can be specifically chosen such that the zero of the magnification filter would suppress or attenuate any output from a sensor that has a pole location farther away than the location of the zero of the filter. In one example, to detect a sensor which has a time constant a magnification filter could be represented (in the frequency domain) as:

$$G(s) = \frac{20s + 1}{\frac{1}{10000}s + 1}$$

The output from the magnification filter can then be sent to the ECU 12. The method 600 proceeds to step 610.

At step 610, the output from the magnification filter can be processed in order to locate negative values. The output from the magnification filter may include negative values when the NOx filter is operating properly. Therefore, detecting the presence of negative values can help determine if the NOx sensor 16 is faulty. If the performance of the NOx sensor 16 deteriorates to the point that the time constant ($\tau$) for that sensor is larger than a predetermined value, such as 20 seconds, then the magnification generated by the magnification filter may be minimal. In that case, the output from the magnification filter may not generate any negative data points. As an example, if the diagnostic threshold is chosen to be at zero, this can indicate that the NOx sensor 16 is not operating properly. Also, data points below the threshold can be detected in various ways. In one example, the values can be detected by using an envelope filter that can be operated by the ECU 12 and stored in memory device 22 at the vehicle 10. The method 600 then ends.

Figure 7:
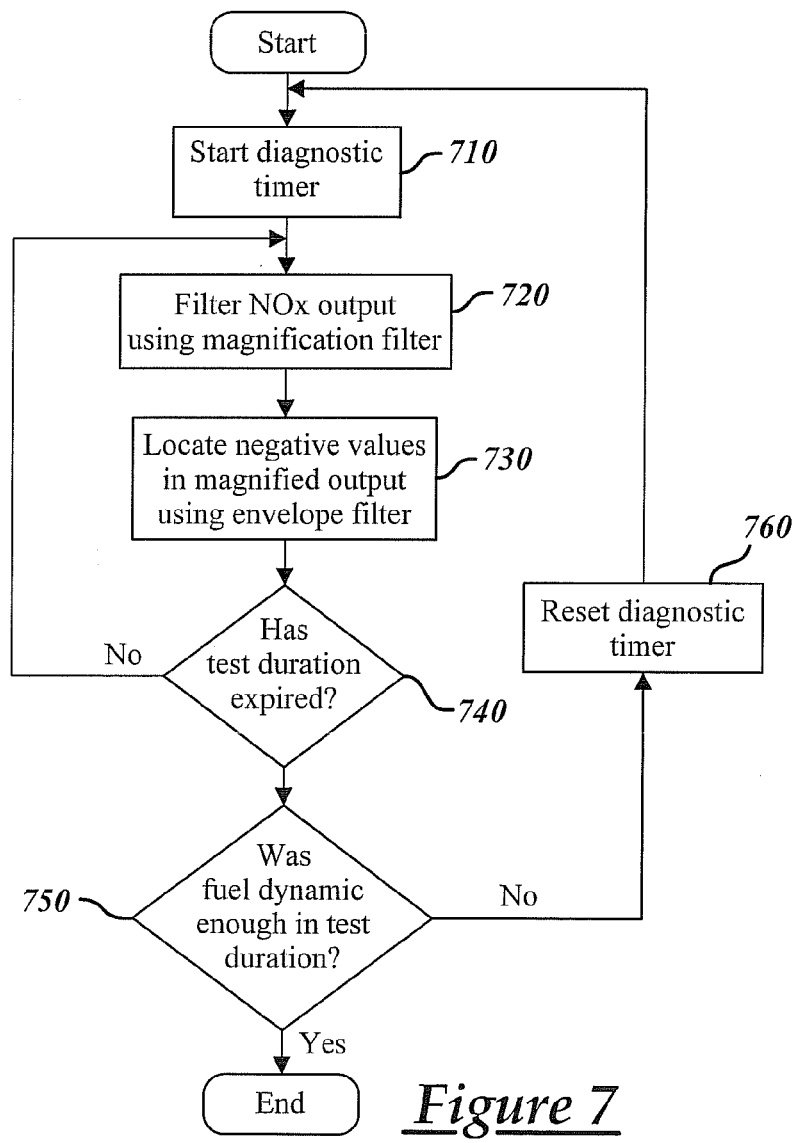
FIG. 7 is a flow chart of yet another exemplary embodiment of the methods described herein.

Another example that involves magnifying the output from a NOx sensor 16 using a selective magnification filter is shown in FIG. 7. There, a method 700 involves starting a diagnostic timer at step 710. The method 700 proceeds to step 720 and NOx sensor output is filtered using a magnification filter. Then, at step 730, the negative values are located in the magnified output using the envelope filter and the method 700 proceeds to step 740. At step 740, it can be determined if the test duration has expired based on the diagnostic timer started at step 710. If not, the method 700 returns to step 720. Otherwise, the method 700 proceeds to step 750 and it is determined if enough fuel variation existed during the test. If not, the diagnostic timer is reset at step 760 and the method 700 returns to step 710. Otherwise, the method 700 ends.

Figure 8A:
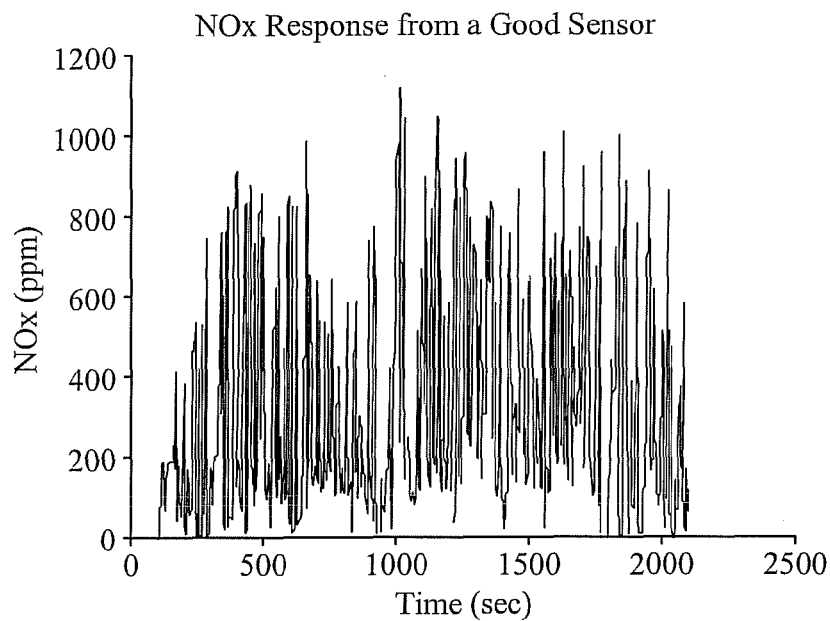
FIGS. 8(a)-(b) are graphs of the output generated by a properly-functioning NOx sensor and the output from a properly-functioning NOx sensor after it has passed through a magnification filter.
Figure 8B:
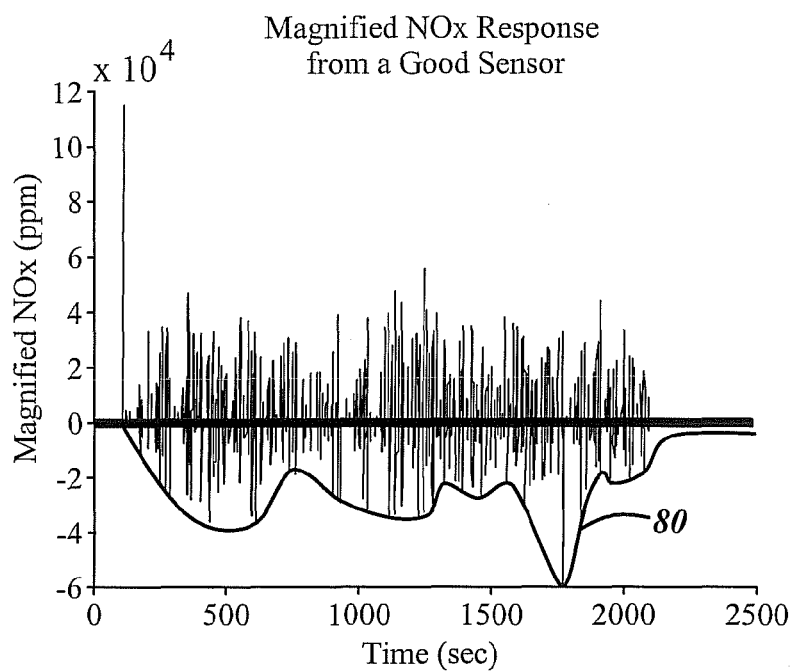
Figure 9A:
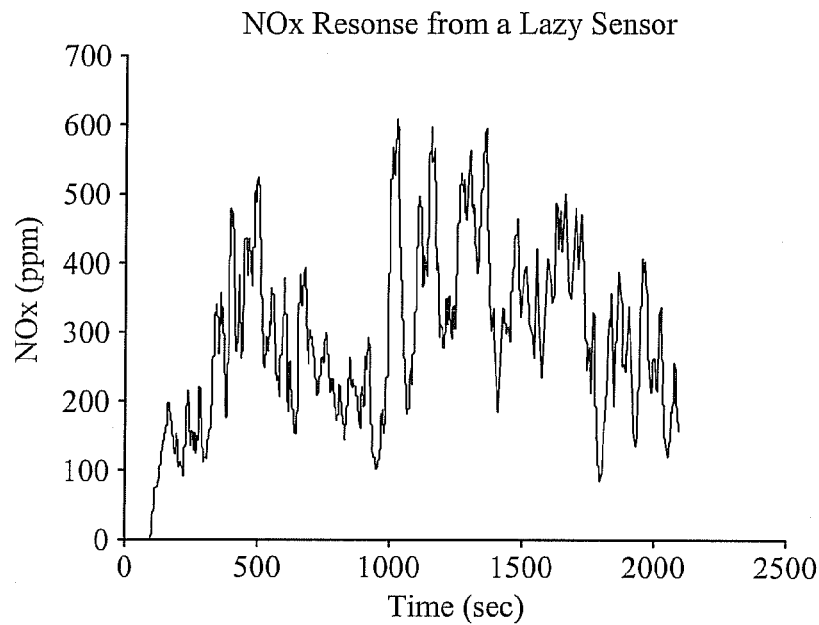
FIGS. 9(a)-(b) shows a graphs of the output generated by a poorly-functioning NOx sensor and the output from a poorly-functioning NOx sensor after it has passed through a magnification filter.
Figure 9B:
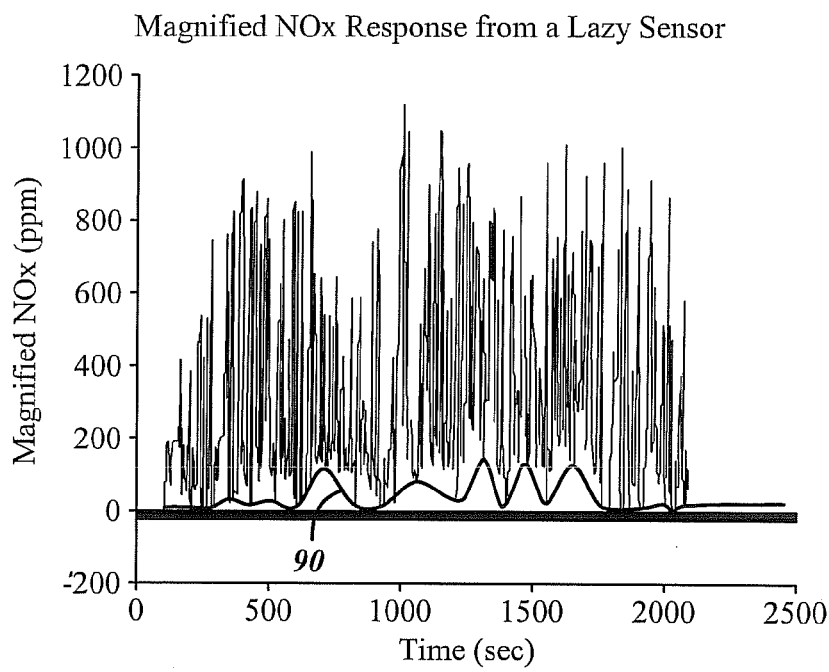

FIG. 8(a) shows a graph of the output generated by a properly-functioning NOx sensor 16 and FIG. 8(b) shows a graph of the output from a properly-functioning NOx sensor 16 after it has passed through the magnification filter. In comparison, FIG. 9(a) shows a graph of the output generated by a poorly-functioning NOx sensor 16 and FIG. 9(b) shows a graph of the output of the poorly-functioning NOx sensor 16 after it has been passed through the magnification filter. As shown in FIG. 8(b), the envelope filter has detected a plurality of negative values, which can indicate that the NOx sensor 16 is functioning properly. The envelope filter results are shown on the graph as a line labeled 80. FIG. 9(b) on the other hand does not include any negative values, as shown by the envelope filter results that are shown on the graph as a line labeled 90. Initialization conditions that can be used to perform diagnostics in the given time range include sufficient dynamics of the fuel flow in the given range, which can then be expected to causes sufficient dynamics in a properly functioning NOx sensor. This may help eliminate false alarms.

Figure 10:
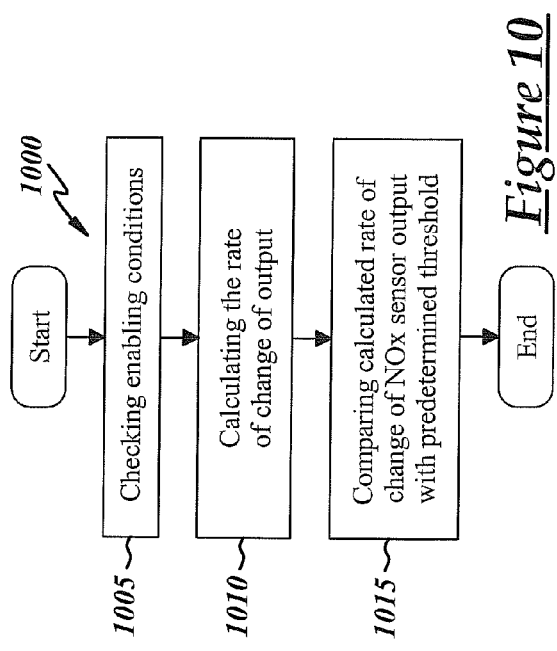
FIG. 10 is a flow chart of yet another exemplary embodiment of the method described herein.

Turning to FIG. 10, there is shown an exemplary method 1000 of diagnosing vehicle NOx sensor faults. The method 1000 involves measuring the functionality of the NOx sensor 16 based on the rate of change in output from the sensor following the stoppage of fuel flow to the vehicle engine. For instance, after stopping the supply of fuel flow to the vehicle engine, the output from the NOx sensor 16 should change faster than a predetermined rate. In other words, the slope of the NOx sensor output should be greater than a predetermined threshold. Moreover, the response of the NOx sensor 16 may be directly correlated to the time constant ($\tau$) of the NOx sensor 16. So when the rate (e.g. slope) of output change from the NOx sensor 16 is below a threshold, it may indicate that the sensor is functioning poorly whereas when the rate of output change is above the threshold it can be determined that the NOx sensor 16 is functioning adequately.

The method 1000 begins at step 1005 by checking one or more enabling conditions for beginning the diagnosis. In order to more confidently assess the NOx sensor performance, certain vehicle operational conditions may be satisfied. For example, in order to obtain a satisfactory rate of output change from the NOx sensor 16 with which to make a decision, it may be helpful to determine if a sufficient amount of fuel is flowing to the vehicle engine. This can be determined by comparing the fuel flow with a predefined threshold to determine if the rate of fuel flow is above the threshold. If so, then the diagnosis may begin; otherwise, the diagnosis will not proceed. This determination can help ensure that there is—at least initially—a sufficient amount of NOx in the exhaust gas before reducing (possibly eliminating) the level of NOx in the exhaust gas. The difference between the initial amount of NOx and the amount of NOx after fuel cutoff should cause the sensor to move an amount significant enough to determine whether or not it is functioning properly. The predetermined threshold can be stored in the memory 22 of the ECU 12—which can also carry out the computer processing capabilities for comparing NOx sensor output to that threshold. Also, the predetermined threshold can be calibrated or changed for a variety of sensors and vehicle performance characteristics, such as different vehicle models or types. Another example of an operational condition includes determining whether or not the stoppage of fuel to the vehicle engine continues for a sufficient amount of time. That way, the diagnostic process can ensure that enough of the output signal received from the NOx sensor 16 can be interpreted during the fuel stoppage to interpret the response of the NOx sensor 16. The method 1000 proceeds to step 1010.

At step 1010, the output from the NOx sensor 16 is received and the rate of change of the output is calculated. This can be carried out using known computer processing capabilities, such as those the ECU 12 is capable of. As the ECU 12 receives the output from the NOx sensor 16, the ECU 12 can use its internal clock, timer, or other time-keeping device to determine the rate of output change per unit time. This determined output rate change can be saved in memory 22 and further calculations can be carried out. For instance, the determined output rate change(s) can be used to calculate a mean value of the output rate changes. The method 1000 proceeds to step 1015.

At step 1015, the calculated rate of change of the NOx sensor output is compared with the predetermined threshold. If the rate of change is above the predetermined threshold, then the NOx sensor 16 can be determined to be functioning adequately. On the other hand, if the calculated rate of change is below the predetermined threshold, then the NOx sensor 16 can be determined to be faulty. It is possible to use a sorting program implemented by the ECU 12 or other computing device to locate a maximum and minimum value among the output rate changes. In some cases, the determined maximum rate change can be compared with the predetermined threshold. And in other cases the determined minimum rate change can be used for comparison with the predetermined threshold. In yet another example, it is also possible to compare the calculated mean from the rate of change of NOx sensor output to the predetermined threshold. Regardless of the comparison, if it is determined that the rate of change of output from the NOx sensor 16 is below the predetermined threshold, then the operator of the vehicle 10 or some other interested party can be alerted of the faulty NOx sensor condition. The operator can be alerted via an in-vehicle audible and/or visual alert. The method 1000 then ends.

Figure 11A:
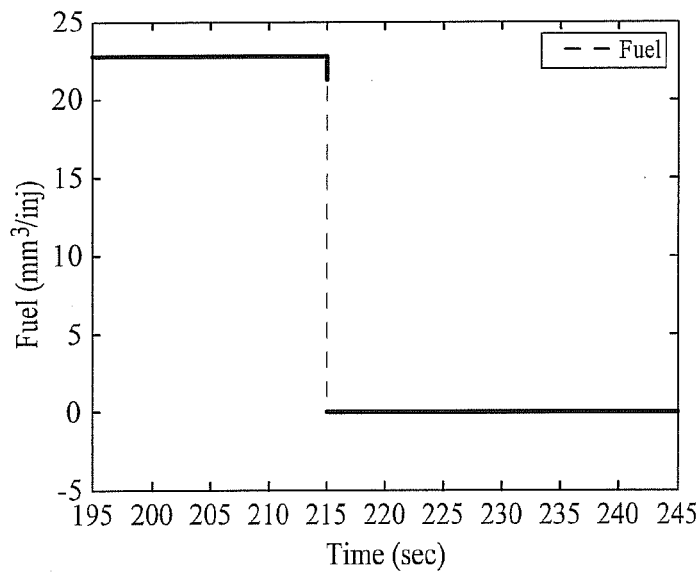
FIGS. 11(a)-(c) are graphs of the stoppage of fuel to the vehicle engine and the output of properly and poorly functioning NOx sensors in response to the fuel stoppage.
Figure 11B:
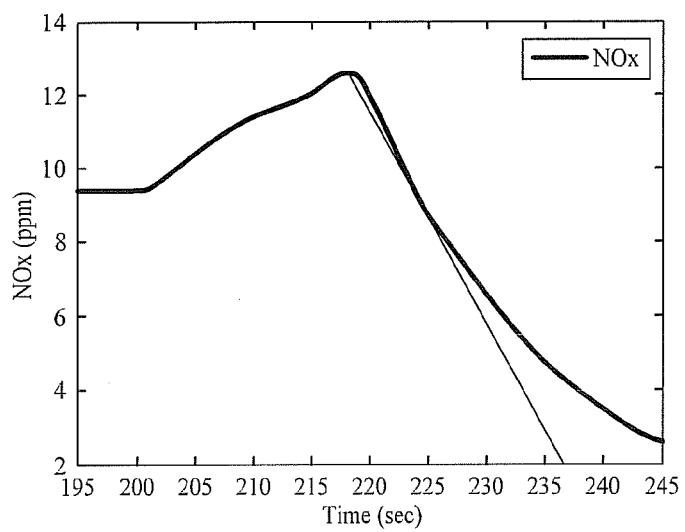
Figure 11C:
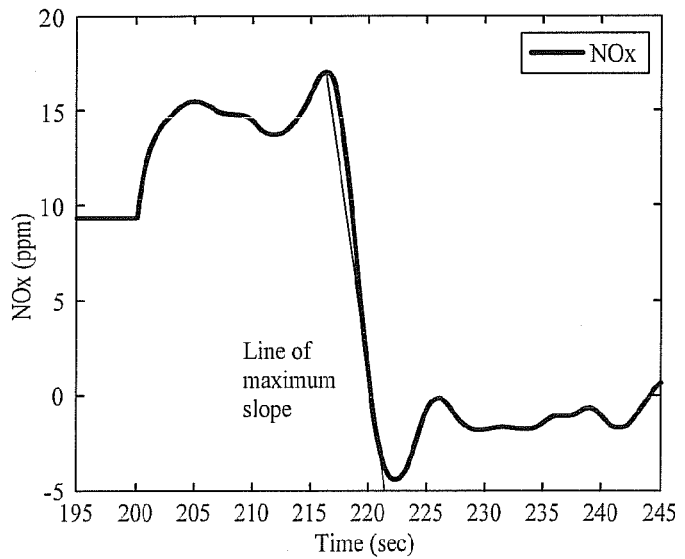

FIG. 11(a) shows graphical representations of the stoppage of fuel to the vehicle engine while FIGS. 11(b)-(c) show the output of poorly and properly functioning NOx sensors 16, respectively, each corresponding to the fuel stoppage shown in FIG. 11(a). FIG. 11(a) shows that the fuel flows to the vehicle engine at a rate of approximately 22.5 mm$^3$/in until the 215 second mark at which point the fuel flow falls to zero. The output from the poorly functioning NOx sensor 16 shown in FIG. 11(b) starts to fall slowly around the 215 second mark creating a smaller rate of change in output and thereby a relatively gentle slope. In comparison, the output from the properly functioning NOx sensor 16 shown in FIG. 11(c) shows sharply falling NOx levels after the 215 second mark until approximately the 220 second mark thereby creating a steeper slope than seen in FIG. 11(b).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. For instance, the methods described above can be preceded by measuring initial vehicle conditions and comparing those conditions to a range of known operational benchmarks. And when the measured initial vehicle conditions fall outside of those operational benchmarks, it can be decided to begin on or more of the methods described above. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of diagnosing vehicle NOx sensor faults, comprising the steps of:
    (a) determining that the fuel flow to the vehicle engine is interrupted using an engine control unit (ECU) to monitor a fuel flow sensor;
    (b) monitoring a NOx sensor at the ECU to determine if the output from the NOx sensor remains above an upper threshold for more than a predetermined amount of time; and
    (c) if so, then deciding at the ECU that a high-offset error exists for the NOx sensor;
    (d) otherwise, deciding at the ECU that a low-offset error exists if the output from the NOx sensor falls below a zero or negative threshold for more than a predetermined amount of time.

2. The method of claim 1, wherein step (b) further comprises using a timer included with an engine control unit (ECU) to determine if the output from the NOx sensor remains above an upper threshold.

3. The method of claim 1, wherein the upper threshold or negative threshold is stored in memory on an engine control unit (ECU).

4. The method of claim 1, further comprising the step of triggering a flag for alerting a vehicle occupant of the low-offset error or the high-offset error.

5. The method of claim 1, further comprising the step of determining if the duration of steps (a)-(d) exceeds a maximum allotted time.

6. A method of diagnosing vehicle NOx sensor faults, comprising the steps of:
    (a) determining the rate of fuel flow to the vehicle engine using an engine control unit (ECU) to monitor a fuel flow sensor;
    (b) receiving the output of the NOx sensor at the ECU;
    (c) calculating the fourth moment of the rate of fuel flow to the vehicle engine and the fourth moment of the rate of output change for the NOx sensor over a plurality of data points using the ECU;
    (d) calculating at the ECU a ratio between the fourth moment of the rate of fuel flow and the fourth moment of the rate of output change for the NOx sensor;
    (e) comparing at the ECU the calculated ratio to a threshold; and
    (f) if the calculated ratio is greater than the threshold, then determining at the ECU that an error condition exists.

7. A method of diagnosing vehicle NOx sensor faults, comprising the steps of:
    (a) passing the output signal from the NOx sensor through a magnification filter;
    (b) detecting the minimum values of output from the magnification filter using a microprocessor;
    (c) determining whether the minimum values are negative using the microprocessor; and
    (d) if the minimum values are not negative, then determining that a fault condition exists with the NOx sensor.

8. The method of claim 7, wherein the minimum values are detected using an envelope filter.

9. The method of claim 7, further comprising the steps of: calculating the mean of the minimum values and determining if the mean of the minimum value is below a predetermined threshold.

10. A method of diagnosing vehicle NOx sensor faults, comprising the steps of:
    (a) detecting that fuel has stopped flowing to the vehicle engine;
    (b) measuring the output from the NOx sensor over a predetermined amount of time;
    (c) calculating the slope of the measured output of the NOx sensor based on time and NOx sensor output;
    (d) determining if the calculated slope is less than a predetermined slope value; and
    (e) if so, then deciding that a sensor is not performing properly, wherein steps (c)-(e) are carried out using an engine control unit (ECU) or a microprocessor.

11. The method of claim 10, wherein the slope of the output is calculated using the mean of the measured output from the NOx sensor.

12. The method of claim 10, wherein the slope of the output is calculated using the minimum value or the maximum value of the measured output from the NOx sensor.

* * * * *